US008100497B2

(12) United States Patent
Mealy et al.

(10) Patent No.: US 8,100,497 B2
(45) Date of Patent: *Jan. 24, 2012

(54) HANDHELD IMAGE TRANSLATION DEVICE (75) Inventors: James Mealy, Corvallis, OR (US); James D. Bledsoe, Corvallis, OR (US); Todd A. McClelland, Corvallis, OR (US); Gregory F. Carlson, Corvallis, OR (US); Gopi Paramesh, Curpertino, CA (US); Asher Simmons, Corvallis, OR (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 12/961,130

(22) Filed: Dec. 6, 2010

(65) Prior Publication Data

US 2011/0074852 A1 Mar. 31, 2011

Related U.S. Application Data (63) Continuation of application No. 12/041,496, filed on Mar. 3, 2008, now Pat. No. 7,845,748.

(60) Provisional application No. 60/892,707, filed on Mar. 2, 2007, provisional application No. 60/892,688, filed on Mar. 2, 2007.

(51) Int. Cl.
*B41J 29/38* (2006.01)
(52) U.S. Cl. .............. 347/14; 347/19; 347/105
(58) Field of Classification Search .......... 347/2, 14, 347/16, 19, 20, 37, 49, 101, 104, 109
See application file for complete search history.

(56) References Cited

U.S. PATENT DOCUMENTS

| | | | |
|---|---|---|---|
| 5,578,813 A | 11/1996 | Allen et al. | |
| 5,640,183 A * | 6/1997 | Hackleman | 347/40 |
| 5,927,872 A | 7/1999 | Yamada | |
| 6,357,939 B1 | 3/2002 | Baron | |
| 7,108,370 B2 | 9/2006 | Breton | |
| 7,748,840 B2 * | 7/2010 | Grandeza et al. | 347/109 |
| 2006/0279784 A1 | 12/2006 | Carlson et al. | |
| 2008/0144053 A1 * | 6/2008 | Gudan et al. | 358/1.8 |

OTHER PUBLICATIONS

U.S. Appl. No. 11/955,209, filed Dec. 12, 2007, Bledsoe et al.
U.S. Appl. No. 11/955,228, filed Dec. 12, 2007, Bledsoe et al.
U.S. Appl. No. 11/955,240, filed Dec. 12, 2007, Bledsoe et al.
U.S. Appl. No. 11/955,258, filed Dec. 12, 2007, Simmons et al.
U.S. Appl. No. 11/959,027, filed Dec. 18, 2007, Simmons et al.
U.S. Appl. No. 11/968,528, filed Jan. 2, 2008, Simmons et al.
U.S. Appl. No. 11/972,462, filed Jan. 10, 2008, Simmons et al.
U.S. Appl. No. 12/013,313, filed Jan. 11, 2008, Bledsoe et al.
U.S. Appl. No. 12/016,833, filed Ja. 18, 2008, Simmons et al.
U.S. Appl. No. 12/036,996, filed Feb. 25, 2008, Bledsoe et al.
U.S. Appl. No. 12/037,029, filed Feb. 25, 2008, Bledsoe et al.
U.S. Appl. No. 12/037,043, filed Feb. 25, 2008, Bledsoe et al.
U.S. Appl. No. 12/038,660, filed Feb. 27, 2008, McKinley et al.
U.S. Appl. No. 12/041,515, filed Mar. 3, 2008, Mealy et al.
U.S. Appl. No. 12/041,535, filed Mar. 3, 2008, Mealy et al.
U.S. Appl. No. 12/062,472, filed Apr. 3, 2008, McKinley et al.

* cited by examiner

*Primary Examiner* — Thinh Nguyen (57) ABSTRACT

Systems, apparatuses, and methods for a handheld image translation device are described herein. The handheld image translation device may include an image capture module to capture surface images of a medium and a positioning module to determine positioning information based at least in part on navigational measurements and/or the captured surface images. A print module of the handheld image translation device may cause print forming substances to be deposited based at least in part on the positioning information. Other embodiments may be described and claimed.

17 Claims, 7 Drawing Sheets

HANDHELD IMAGE TRANSLATION DEVICE

CROSS-REFERENCES TO RELATED APPLICATIONS

This present application is a continuation of non-provisional application Ser. No. 12/041,496, filed Mar. 3, 2008 entitled "HANDHELD IMAGE TRANSLATION DEVICE," now U.S. Pat. No. 7,845,748, issued Dec. 7, 2010, which claims priority to provisional application 60/892,688, filed on Mar. 2, 2007, and provisional application 60/892,707 filed on Mar. 2, 2007. The specifications of said applications are hereby incorporated in their entirety, except for those sections, if any, that are inconsistent with this specification.

TECHNICAL FIELD

Embodiments of the present invention relate to the field of image translation and, in particular, to a handheld image translation device.

BACKGROUND

Traditional printing devices rely on a mechanically operated carriage to transport a print head in a linear direction as other mechanics advance a print medium in an orthogonal direction. As the print head moves over the print medium an image may be laid down. Portable printers have been developed through technologies that reduce the size of the operating mechanics. However, the principles of providing relative movement between the print head and print medium remain the same as traditional printing devices. Accordingly, these mechanics limit the reduction of size of the printer as well as the material that may be used as the print medium.

Handheld printing devices have been developed that ostensibly allow an operator to manipulate a handheld device over a print medium in order to print an image onto the medium. However, these devices are challenged by the unpredictable and nonlinear movement of the device by the operator. The variations of operator movement make it difficult to determine the precise location of the print head. This type of positioning error may have deleterious effects of the quality of the printed image. This is especially the case for relatively large print jobs, as the positioning error may accumulate in a compounded manner over the entire print operation.

SUMMARY

In view of the challenges in the state of the art, at least some embodiments of the present invention are based on the technical problem of providing a handheld image translation device that may accurately determine position of the device over an entire image translation operation. More specifically, there is provided, in accordance with various embodiments of the present invention, a control block of a handheld image translation device that may include a communication interface to receive an image from an image source; a positioning module to control one or more navigation sensors to capture a first plurality of navigational measurements, the positioning module to determine a position of the device relative to a reference point based at least in part on the first plurality of navigational measurements; an image capture module to control one or more optical imaging sensors to capture a first plurality of surface images of a medium adjacent to the image translation device; and a print module to cause a printing substance to be deposited on the medium based at least in part on the image received by the communication interface and the determined position of the device.

In some embodiments, the positioning module may control the one or more navigation sensors to capture a second plurality of navigational measurements and determine a plurality of positions of the device relative to a reference point based at least in part on the second plurality of navigational measurements. The image capture module may control the one or more optical imaging sensors to capture a second plurality of surface images of a second medium and construct a composite image based at least in part on the second plurality of surface images and the determined plurality of positions of the device.

In some embodiments, the positioning module may determine the position of the device relative to a reference point based at least further in part on the first plurality of surface images.

In some embodiments, the communication interface may include a wireless communication interface and/or a port to receive a removable storage device.

In some embodiments, the control block may include an image processing module to process the image received by the communication interface in a manner to facilitate depositing of the printing substance.

There is also provided, in accordance with various embodiments of the present invention, an image translation device that may include a communication interface to receive an image from an image source; one or more optical imaging sensors to capture a first plurality of surface images of a first medium; one or more navigation sensors to capture a first plurality of navigational measurements; a print head to deposit a printing substance on the first medium; and a control block to determine a position of the device relative to a reference point based at least in part on the first plurality of navigational measurements, and to control the print head to deposit the printing substance based at least in part on the image received by the communication interface and the determined position of the device.

In some embodiments, the one or more optical imaging sensors of the device may capture a second plurality of surface images of a second medium; the one or more navigation sensors may capture a second plurality of navigational measurements, and the control block may determine a plurality of positions of the device relative to another reference point based at least in part on the second plurality of navigational measurements and construct a composite image based at least in part on the second plurality of surface images and the determined plurality of positions of the device.

In some embodiments, the print head may have a linear dimension and include one or more nozzle rows. The one or more optical imaging sensors may include a linear array of optical elements having a linear dimension that is similar to the linear dimension of the print head.

In some embodiments, the print head may include a plurality of nozzles and the one or more optical imaging sensors may include a plurality of optical elements. A first set of the plurality of nozzles may be arranged on a first side of the plurality of optical elements and a second set of the plurality of nozzles may be arranged on a second side of the plurality of optical elements. The first set of the plurality of nozzles may include nozzles for a first colored printing substance and nozzles for a second colored printing substance.

In some embodiments, a third set of the plurality of nozzles may be arranged on a third side of the plurality of optical elements and a fourth set of the plurality of nozzles may be arranged on a fourth side of the plurality of optical elements. The nozzles may be arranged around the plurality of optical elements, e.g., in rings.

A method is also provided in accordance with various embodiments. The method may include receiving an image from an image source; controlling one or more navigation sensors to capture a first plurality of navigational measurements; controlling one or more optical image sensors to capture a first plurality of surface images of a first medium adjacent to the optical imaging sensors; determining a position of an image translation device relative to a reference point based at least in part on the first plurality of navigational measurements; and controlling a print head to deposit a printing substance on the first medium based at least in part on the received image and the determined position.

In some embodiments, the method may further include controlling the one or more navigation sensors to capture a second plurality of navigational measurements; determining a plurality of positions of the image translation device relative to another reference point based at least in part on the second plurality of navigational measurements; controlling the one or more optical image sensors to capture a second plurality of surface images of a second medium; and constructing a composite image based at least in part on the determined plurality of positions and the second plurality of surface images.

In some embodiments, the method may include determining the position of the device based at least further in part on the first plurality of surface images.

In some embodiments, the method may include processing the received image in a manner to facilitate said controlling of the print head to deposit the printing substance.

In still other embodiments, an image translation device may be provided with means for receiving an image from an image source; means for capturing a plurality of navigational measurements; means for capturing a first plurality of surface images of a medium adjacent to the device; means for determining at least a position of the device relative to a reference point based at least in part on the first plurality of navigational measurements; and means for depositing a printing substance on the first medium based at least in part on the received image and the determined position.

In some embodiments, the image translation device may further include means for capturing a second plurality of navigational measurements; means for determining a plurality of positions of the apparatus relative to another reference point based at least in part on the second plurality of navigational measurements; means for capturing a second plurality of surface images of a second medium adjacent to the apparatus; and means for constructing a composite image based at least in part on the determined plurality of positions and the another second plurality of surface images.

In some embodiments, the determining of the position of the device may include determining the position of the device based at least further in part on the first plurality of surface images.

A machine-accessible medium having associated instructions is also provided in accordance with various embodiments. The associated instructions, when executed, may result in an image translation device receiving an image from an image source; controlling one or more navigation sensors to capture a plurality of navigational measurements; controlling one or more optical image sensors to capture a plurality of surface images of a medium adjacent to the device; determining a position of the device relative to a reference point based at least in part on the first plurality of navigational measurements; and controlling a print head to deposit a printing substance on the first medium based at least in part on the received image and the determined position.

In some embodiments, the associated instructions, when executed, further results in the device controlling the one or more navigation sensors to capture a second plurality of navigational measurements; determining a plurality of positions of the device relative to another reference point based at least in part on the second plurality of navigational measurements; controlling the one or more optical image sensors to capture a second plurality of surface images of a second medium; and constructing a composite image based at least in part on the determined plurality of positions and the second plurality of surface images.

In some embodiments, the associated instructions, when executed, further results in the device determining the position of the device based at least further in part the first plurality of surface images.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Figure 1:
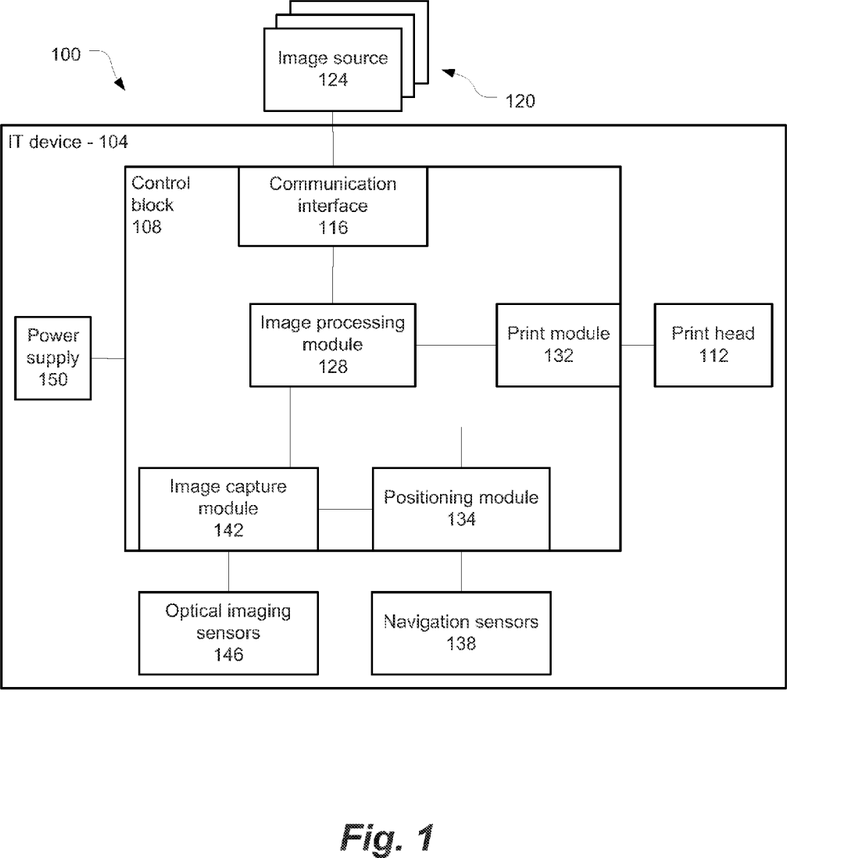
FIG. 1 is a schematic of a system including a handheld image translation device in accordance with various embodiments of the present invention.

FIG. 1 is a schematic of a system 100 including a handheld image translation device 104, hereinafter IT device 104, in accordance with various embodiments of the present invention. The IT device 104 may include a control block 108 with components designed to facilitate precise and accurate positioning of a print head 112 and/or optical imaging sensors 146 throughout an entire image translation operation. This positioning may allow for reliable image translation in a truly mobile and versatile platform.

Image translation, as used herein, may refer to a translation of an image that exists in a particular context (e.g., medium) into an image in another context. For example, an image translation operation may be a scan operation. In this situation, a target image, e.g., an image that exists on a tangible medium, is scanned by the IT device 104 and an acquired image that corresponds to the target image is created and stored in memory of the IT device 104. For another example, an image translation operation may be a print operation. In this situation, an acquired image, e.g., an image as it exists in memory of the IT device 104, may be printed onto a print medium.

The control block 108 may include a communication interface 116 configured to communicatively couple the control block 108 to other devices 120, which may include an image source 124. The image source 124 may be any type of device capable of transmitting data related to an image to be printed. The image source 124 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image source 124 is a removable storage device, e.g., a universal serial bus (USB) storage device, the communication interface may include a port, e.g., USB port, designed to receive the storage device.

The communication interface 116 may include a wireless transceiver to allow the communicative coupling with the image source 124 to take place over a wireless link. The image data may be wirelessly transmitted over the link through the modulation of electromagnetic waves with frequencies in the radio, infrared or microwave spectrums.

A wireless link may contribute to the mobility and versatility of the IT device 104. However, some embodiments may additionally/alternatively include a wired link communicatively coupling one or more of the other devices 120 to the communication interface 116.

In some embodiments, the communication interface 116 may communicate with the other devices 120 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

The communication interface 116 may transmit the received image data to an on-board image processing module 128. The image processing module 128 may process the received image data in a manner to facilitate an upcoming printing process. Image processing techniques may include dithering, decompression, half-toning, color plane separation, and/or image storage. In various embodiments some or all of these image processing operations may be performed by the image source 124 or another device. The processed image may then be transmitted to a print module 132 where it is cached in anticipation of a print operation.

The print module 132 may also receive positioning information, indicative of a position of the print head 112 relative to a reference point, from a positioning module 134. The positioning module 134 may be communicatively coupled to one or more navigation sensors 138 configured to capture navigational measurements. In some embodiments, the navigational measurements may be navigational images of a medium adjacent to the IT device 104. In these embodiments, the navigation sensors may also be referred to as imaging navigation sensors. An imaging navigation sensor may include a light source, e.g., LED, a laser, etc., and an opto-electronic sensor designed to capture a series of navigational images of an adjacent medium as the IT device 104 is moved over the medium. The positioning module 134 may process the images provided by the imaging navigation sensors to detect structural variations of the medium. The movement of the structural variations in successive images may indicate motion of the IT device 104 relative to the medium. Tracking this relative movement may facilitate determination of the precise positioning of the navigation sensors 138. The navigation sensors 138 may be maintained in a structurally rigid relationship with the print head 112, thereby allowing for the calculation of the precise location of the print head 112. In other embodiments, non-imaging navigation sensors may be additionally/alternatively used to capture other navigational measurements.

Navigation sensors may have operating characteristics sufficient to track movement of the IT device 104 with the desired degree of precision. In one example, imaging navigation sensors may process approximately 2000 frames per second, with each frame including a rectangular array of 30×30 pixels. Each pixel may detect a six-bit interference pattern value, e.g., capable of sensing 64 different levels of patterning.

Once the print module 132 receives the positioning information it may coordinate the location of the print head 112 to a portion of the processed image with a corresponding location. The print module 132 may then control the print head 112 in a manner to deposit a printing substance on the medium to represent the corresponding portion of the processed image.

The print head 112 may be an inkjet print head having a plurality of nozzles designed to emit liquid ink droplets. The ink, which may be contained in reservoirs/cartridges, may be black and/or any of a number of various colors. A common, full-color inkjet print head may have nozzles for cyan, magenta, yellow, and black ink. Other embodiments may utilize other printing techniques, e.g., toner-based printers such as laser or light-emitting diode (LED) printers, solid ink printers, dye-sublimation printers, inkless printers, etc.

The control block 108 may also include an image capture module 142. The image capture module 142 may be communicatively coupled to one or more optical imaging sensors 146. The optical imaging sensors 146 may include a number of individual sensor elements. The optical imaging sensors 146 may be designed to capture a plurality of surface images of the medium, which may be individually referred to as component surface images. The image capture module 142 may generate a composite image by stitching together the component surface images. The image capture module 142 may receive positioning information from the positioning module 134 to facilitate the arrangement of the component surface images into the composite image.

Relative to an imaging navigation sensor, an optical imaging sensor may have a higher resolution, smaller pixel size, and/or higher light requirements. While an imaging navigation sensor may be configured to capture details about the structure of the underlying medium, an optical imaging sensor may be configured to capture an image of the surface of the medium itself.

In an embodiment in which the IT device 104 is capable of scanning full color images, the optical imaging sensors 146 may have the sensors elements designed to scan different colors.

A composite image acquired by the IT device 104 may be subsequently transmitted to one or more of the other devices 120 by, e.g., e-mail, fax, file transfer protocols, etc. The composite image may be additionally/alternatively stored locally by the IT device 104 for subsequent review, transmittal, printing, etc.

In addition (or as an alternative) to composite image acquisition, the image capture module 142 may be utilized for calibrating the positioning module 134. In various embodiments, the component surface images (whether individually, some group, or collectively as the composite image) may be compared to the processed print image rendered by the image processing module 128 to correct for accumulated positioning errors and/or to reorient the positioning module 134 in the event the positioning module 134 loses track of its reference point. This may occur, for example, if the IT device 104 is removed from the medium during an IT operation.

The IT device 104 may include a power supply 150 coupled to the control block 108. The power supply 150 may be a mobile power supply, e.g., a battery, a rechargeable battery, a solar power source, etc. In other embodiments the power supply 150 may additionally/alternatively regulate power provided by another component (e.g., one of the other devices 120, a power cord coupled to an alternating current (AC) outlet, etc.).

Figure 2:
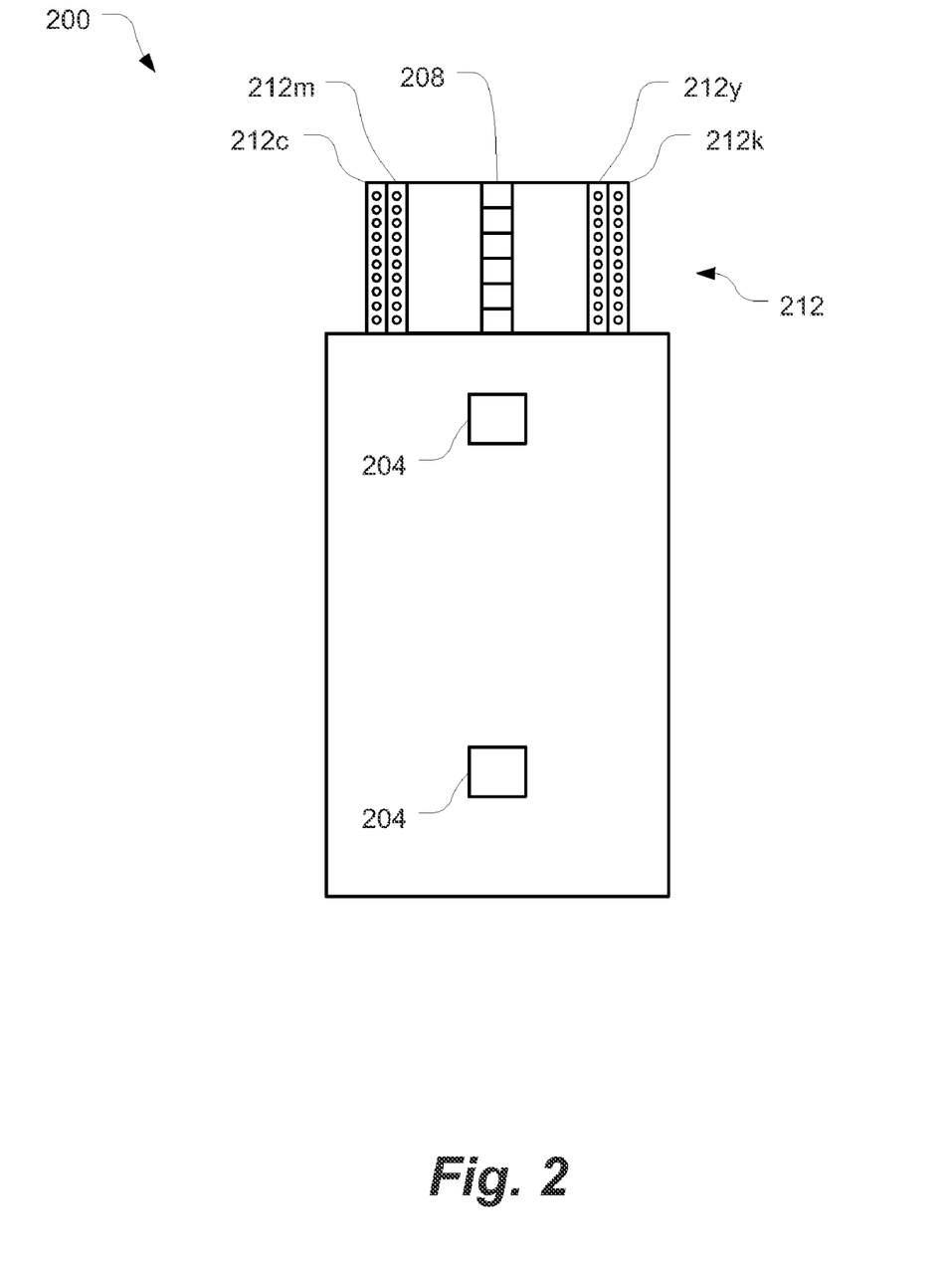
FIG. 2 is a bottom plan view of a handheld image translation device in accordance with various embodiments of the present invention.

FIG. 2 is a bottom plan view of an IT device 200 in accordance with various embodiments of the present invention. The IT device 200, which may be substantially interchangeable with IT device 104, may have a pair of navigation sensors 204, optical imaging sensors 208, and a print head 212.

The pair of navigation sensors 204 may be used by a positioning module to determine positioning information related to the optical imaging sensors 208 and/or the print head 212. As stated above, the proximal relationship of the optical imaging sensors 208 and/or print head 212 to the navigation sensors 204 may be fixed to facilitate the positioning of the optical imaging sensors 208 and/or print head 212 through information obtained by the navigation sensors 204.

The print head 212 may be an inkjet print head having a number of nozzle rows for different colored inks. In particular, and as shown in FIG. 2, the print head 212 may have a nozzle row 212c for cyan-colored ink, a nozzle row 212m for magenta-colored ink, a nozzle row 212y for yellow-colored ink, and nozzle row 212k for black-colored ink. The nozzle rows of the print head 212 may be arranged around the optical imaging sensors 208. This may allow for the optical imaging sensors 208 to capture information about the ink deposited on the medium, which represents the processed image in various formative stages, for the predominant side-to-side motion of the IT device 200.

In various embodiments the placement of the nozzles of the print head 212 and the sensor elements of the optical imaging sensors 208 may be further configured to account for the unpredictable nature of movement of the hand-propelled IT device 200. For example, while the nozzles and sensor elements are arranged in linear arrays in the IT device 200 other embodiments may arrange the nozzles and/or sensor elements in other patterns. In some embodiments the nozzles may be arranged completely around the sensor elements so that whichever way the IT device 200 is moved the optical imaging sensors 208 will capture component images reflecting deposited ink. In some embodiments, the nozzles may be arranged in rings around the sensor elements (e.g., concentric circles, nested rectangular patterns, etc.).

While the nozzle rows 212c, 212m, 212y, and 212k shown in FIG. 2 are arranged in rows according to their color, other embodiments may intermix the different colored nozzles in a manner that may increase the chances that an adequate amount of appropriate colored ink is deposited on the medium through the natural course of movement of the IT device 200 over the medium.

In the embodiment depicted by FIG. 2, the linear dimension of the optical imaging sensors 208 may be similar to the linear dimension of the nozzle rows of the print head 212. The linear dimensions may refer to the dimensions along the major axis of the particular component, e.g., the vertical axis of the optical imaging sensors 208 as shown in FIG. 2. Having similar linear dimensions may provide that roughly the same amount of passes over a medium are required for a complete image translation operation. Furthermore, having similar dimensions may also facilitate the positioning calibration as a component surface image captured by the optical imaging sensors 208 may correspond to deposits from an entire nozzle row of the print head 212.

Figure 3:
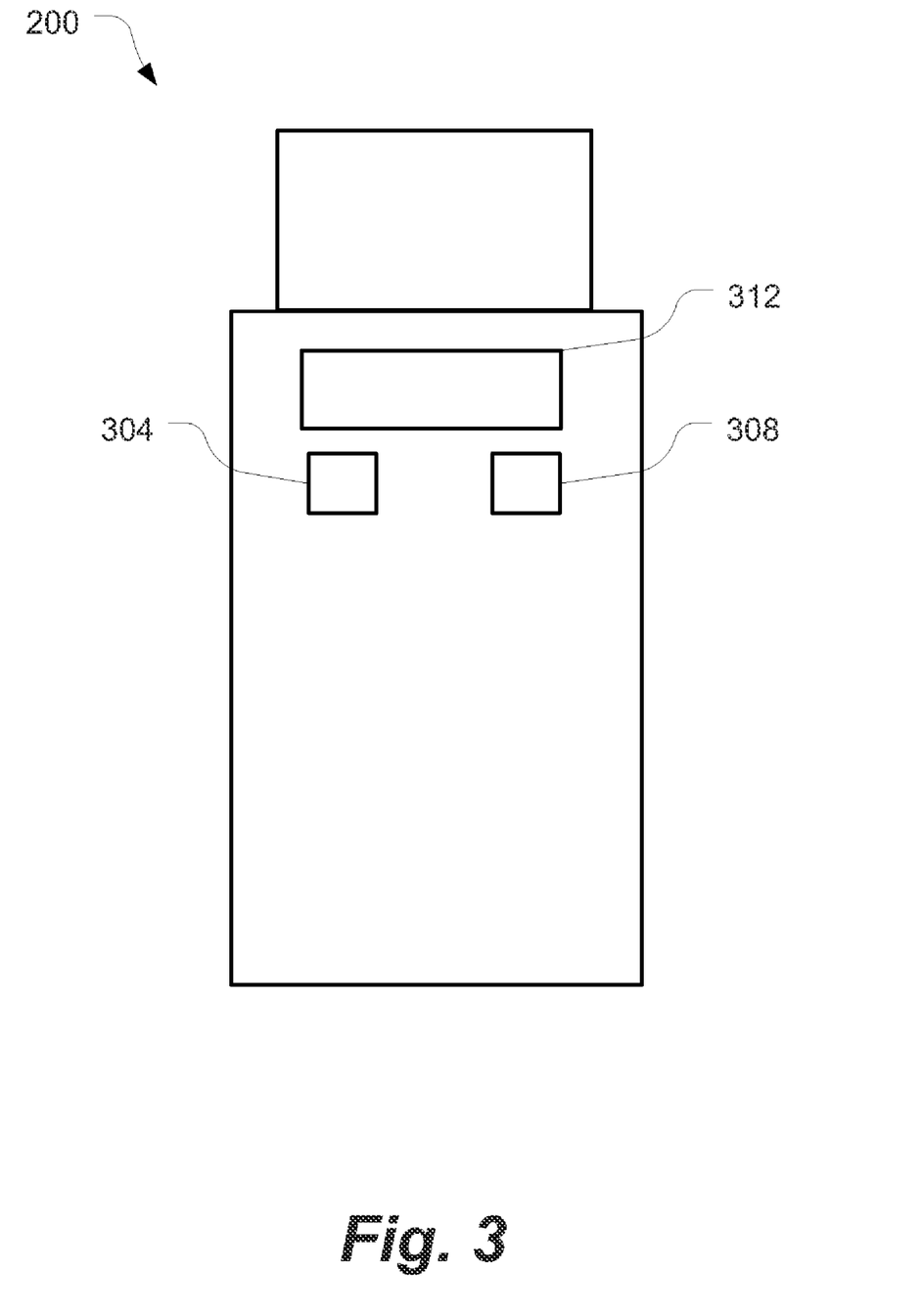
FIG. 3 is a top plan view of an image translation device in accordance with various embodiments of the present invention.

FIG. 3 is a top plan view of the IT device 200 in accordance with various embodiments of the present invention. The IT device 200 may have a variety of user input/outputs to provide the functionality enabled through use of the IT device 200. Some examples of input/outputs that may be used to provide some of the basic functions of the IT device 200 include, but are not limited to, a print control input 304 to initiate/resume a print operation, a scan control input 308 to initiate/resume a scan operation, and a display 312.

The display 312, which may be a passive display, an interactive display, etc., may provide the user with a variety of information. The information may relate to the current operating status of the IT device 200 (e.g., printing, ready to print, scanning, ready to scan, receiving print image, transmitting print image, transmitting scan image, etc.), power of the battery, errors (e.g., scanning/positioning/printing error, etc.), instructions (e.g., "position device over a printed portion of the image for reorientation," etc.). If the display 312 is an interactive display it may provide a control interface in addition to, or as an alternative from, the control inputs 304 and 308.

Figure 4:
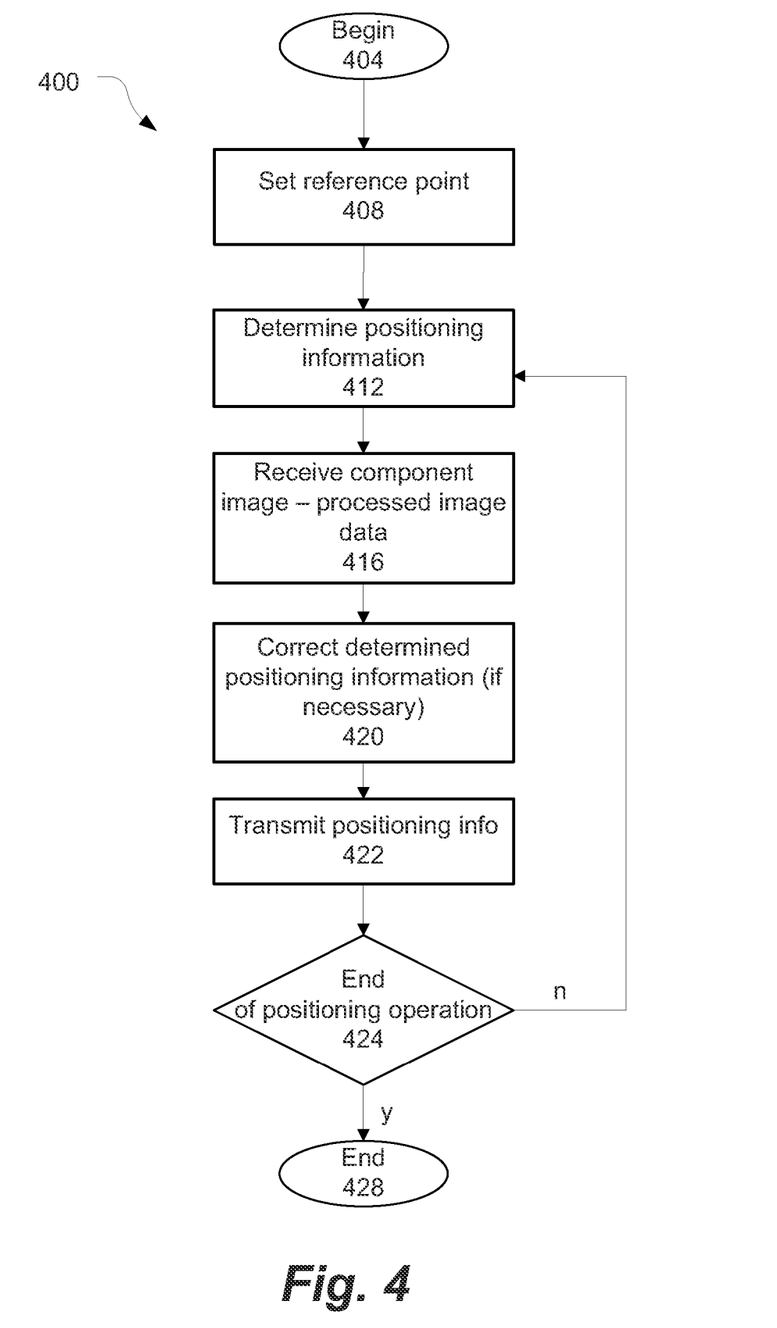
FIG. 4 is a flow diagram depicting a positioning operation of a handheld image translation device in accordance with various embodiments of the present invention.

FIG. 4 is a flow diagram 400 depicting a positioning operation of the IT device 200 in accordance with various embodiments of the present invention. A positioning operation may begin in block 404 with an initiation of a scanning or a printing operation, e.g., by activation of the print control input 304 or the scan control input 308. A positioning module within the IT device 200 may set a reference point in block 408. The reference point may be set when the IT device 200 is placed onto a medium at the beginning of a print or scan job. This may be ensured by the user being instructed to activate the control input once the IT device 200 is in place and/or by the proper placement of the IT device 200 being treated as a condition precedent to instituting the positioning operation. In some embodiments the proper placement of the IT device 200 may be automatically determined through the navigation sensors 204, the optical imaging sensors 208, and/or some other sensors (e.g., a proximity sensor).

Once the reference point is set in block 408, the positioning module may determine positioning information, e.g., translational and/or rotational changes from the reference point, using the navigation sensors 204 in block 412. The translational changes may be determined by tracking incremental changes of the positions of the navigation sensors along a two-dimensional coordinate system, e.g., $\Delta x$ and $\Delta y$. Rotational changes may be determined by tracking incremental changes in the angle of the IT device, e.g., $\Delta \Theta$, with respect to, e.g., the y-axis. These transitional and/or rotational changes may be determined by the positioning module comparing consecutive navigational measurements, e.g., images, captured by the navigation sensors 204 to detect these movements.

The positioning module may also receive component surface images from the optical imaging sensors 208 and processed image data from the image processing module in block 416. If the positioning information is accurate, a particular component surface image from a given location should match a corresponding portion of the processed image. If the given location is one in which the print head 212 has deposited something less than the target print volume for the location, the corresponding portion of the processed image may be adjusted to account for the actual deposited volume for comparison to the component surface image. In the event that the print head 212 has yet to deposit any material in the given location, the positioning information may not be verified through this method. However, the verification of the positioning information may be done frequently enough given the constant movement of the IT device 200 and the physical arrangement of the nozzle rows of the print head 212 in relation to the optical imaging sensors 208.

If the particular component surface image from the given location does not match the corresponding portion of the processed image the positioning module may correct the determined positioning information in block 420. Given adequate information, e.g., sufficient material deposited in the location captured by the component surface image, the positioning module may set the positioning information to the offset of the portion of the processed image that matches the component surface image. In most cases this may be an identified pattern in close proximity to the location identified by the incorrect positioning information. In the event that the pattern captured by the component surface image does not identify a pattern unique to the region surrounding the incorrect positioning information, multiple component surface images may be combined in an attempt to identify a unique pattern. Alternatively, correction may be postponed until a component surface image is captured that does identify a pattern unique to the surrounding region.

In some embodiments, the correction of the determined positioning information in block 420 may be done periodically in order to avoid overburdening the computational resources of the positioning module.

Following correction in block 420, the positioning module may transmit the positioning information to the print module and/or image capture module in block 422 and determine whether the positioning operation is complete in block 424. If it is determined that the positioning operation is not yet complete, the operation may loop back to block 412. If it is determined that it is the end of the positioning operation, the operation may end in block 428. The end of the positioning operation may be tied to the end of the image translation operation, which will be discussed with reference to FIGS. 5 and 6, respectively.

Figure 5:
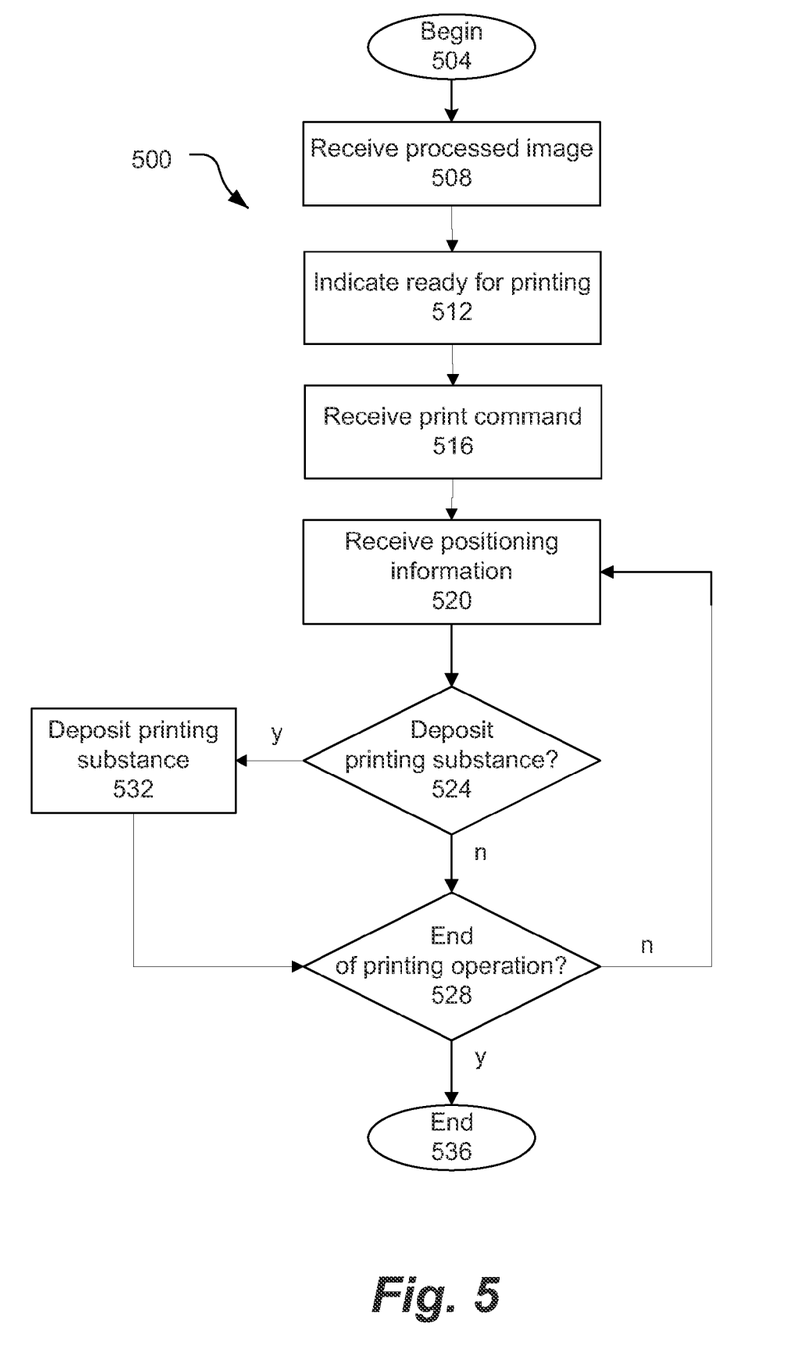
FIG. 5 is a flow diagram depicting a printing operation of a handheld image translation device in accordance with various embodiments of the present invention.

FIG. 5 is a flow diagram 500 depicting a printing operation of the IT device 200 in accordance with various embodiments of the present invention. The printing operation may begin in block 504. The print module may receive a processed image from the image processing module in block 508. Upon receipt of the processed image, the display may indicate that the IT device 200 is ready for printing in block 512.

The print module may receive a print command generated from a user activating the print control input 304 in block 516. The print module may then receive positioning information from the positioning module in block 520. The print module may then determine whether to deposit printing substance at the given position in block 524. The determination as to whether to deposit printing substance may be a function of the total drop volume for a given location and the amount of volume that has been previously deposited.

If it is determined that no additional printing substance is to be deposited in block 524, the operation may advance to block 528 to determine whether the end of the print operation has been reached. If it is determined that additional printing substance is to be deposited in block 524, the print module may cause an appropriate amount of printing substance to be deposited in block 532 by generating and transmitting control signals to the print head that cause the nozzles to drop the printing substance.

The determination of whether the end of the printing operation has been reached in block 528 may be a function of the printed volume versus the total print volume. In some embodiments the end of the printing operation may be reached even if the printed volume is less than the total print volume. For example, an embodiment may consider the end of the printing operation to occur when the printed volume is ninety-five percent of the total print volume. However, it may be that the distribution of the remaining volume is also considered in the end of print analysis. For example, if the five percent remaining volume is distributed over a relatively small area, the printing operation may not be considered to be completed.

In some embodiments, an end of print job may be established by a user manually cancelling the operation.

If, in block 528, it is determined that the printing operation has been completed, the printing operation may conclude in block 536.

If, in block 528, it is determined that the printing operation has not been completed, the printing operation may loop back to block 520.

Figure 6:
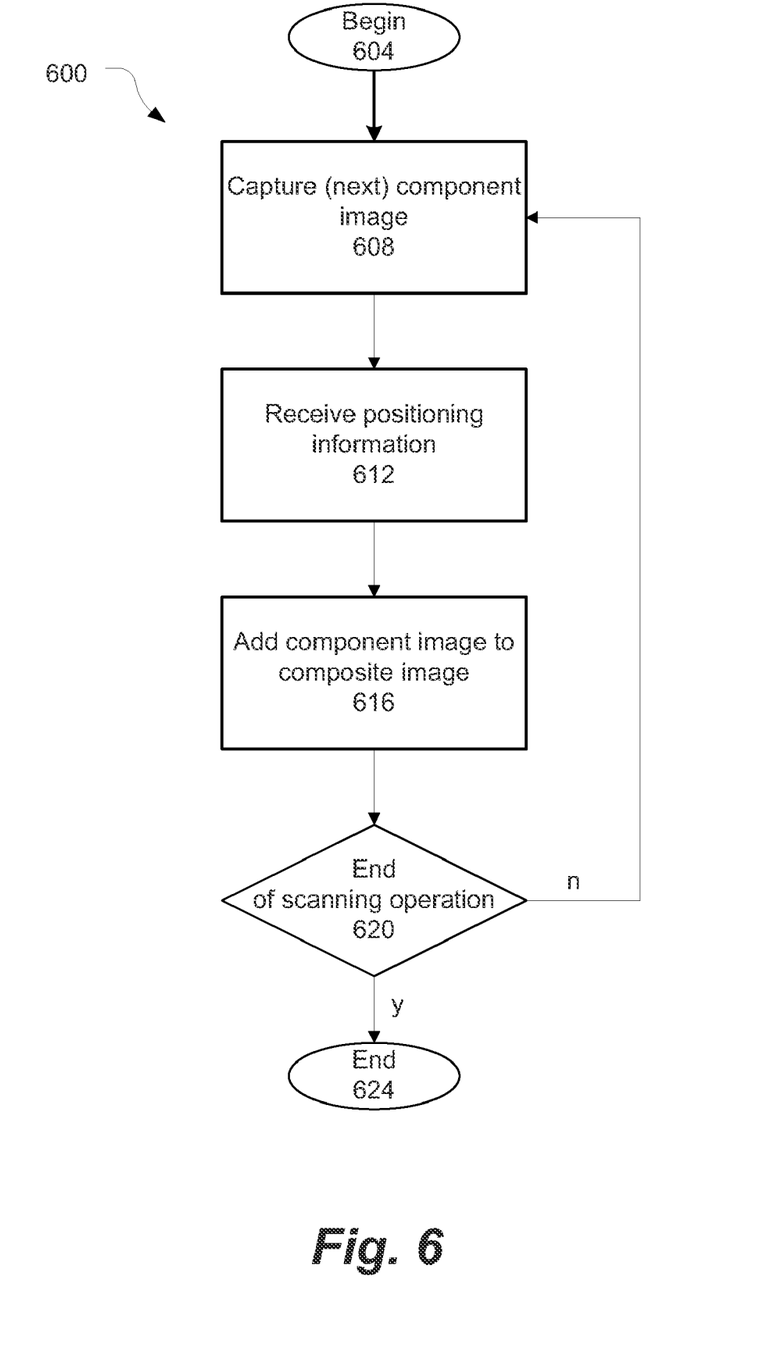
FIG. 6 is a flow diagram depicting a scanning operation of a handheld image translation device in accordance with various embodiments of the present invention.

FIG. 6 is a flow diagram 600 depicting a scanning operation of the IT device 200 in accordance with various embodiments of the present invention. The scanning operation may begin in block 604 with the receipt of a scan command generated from a user activating the scan control input 308.

The image capture module may control the optical imaging sensors 208 to capture one or more component images in block 608. In some embodiments, the scan operation will only commence when the IT device 200 is placed on a medium. This may be ensured by manners similar to those discussed above with respect to the printing operation, e.g., by instructing the user to initiate scanning operation only when the IT device 200 is in place and/or automatically determining that the IT device 200 is in place.

The image capture module may receive positioning information from the positioning module in block 612 and add the component images to the composite image in block 616. The image capture module may then determine if the scanning operation is complete in block 620.

The end of the scanning operation may be determined through a user manually cancelling the operation and/or through an automatic determination. In some embodiments, an automatic determination of the end of print job may occur when all interior locations of a predefined image border have been scanned. The predefined image border may be determined by a user providing the dimensions of the image to be scanned or by tracing the border with the IT device 200 early in the scanning sequence.

If, in block 620, it is determined that the scanning operation has been completed, the scanning operation may conclude in block 624.

If, in block 620, it is determined that the scanning operation has not been completed, the printing operation may loop back to block 608.

Figure 7:
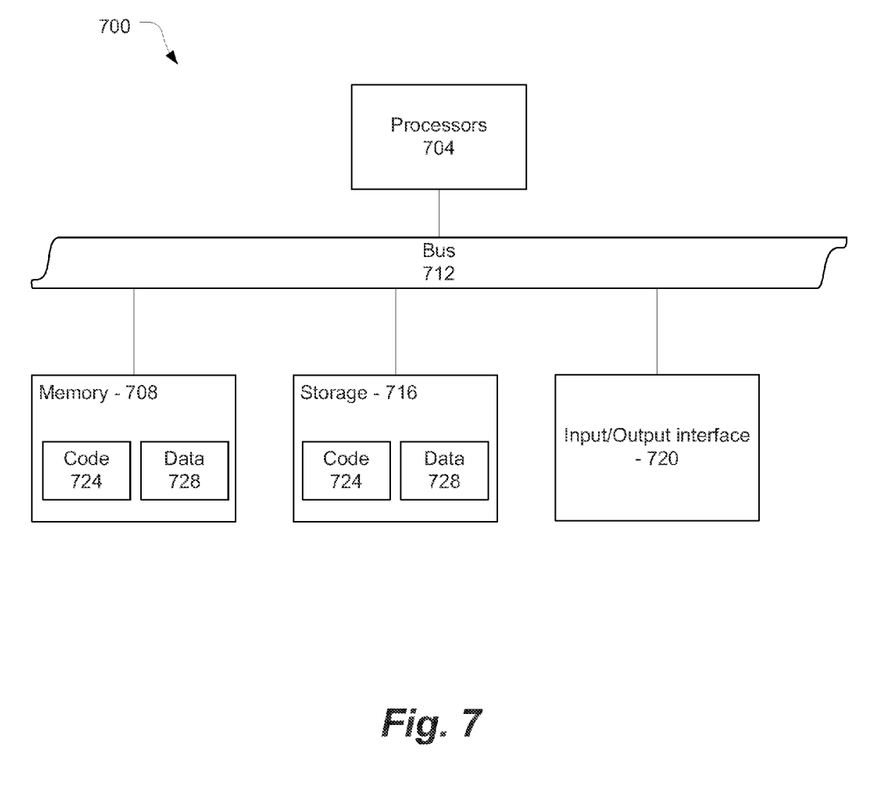
FIG. 7 illustrates a computing device capable of implementing a control block of a handheld image translation device in accordance with various embodiments of the present invention.

FIG. 7 illustrates a computing device 700 capable of implementing a control block, e.g., control block 108, in accordance with various embodiments. As illustrated, for the embodiments, computing device 700 includes one or more processors 704, memory 708, and bus 712, coupled to each other as shown. Additionally, computing device 700 includes storage 716, and one or more input/output interfaces 720 coupled to each other, and the earlier described elements as shown. The components of the computing device 700 may be designed to provide the image translation functions of a control block of an IT device as described herein.

Memory 708 and storage 716 may include, in particular, temporal and persistent copies of code 724 and data 728, respectively. The code 724 may include instructions that when accessed by the processors 704 result in the computing device 700 performing operations as described in conjunction with various modules of the control block in accordance with embodiments of this invention. The processing data 728 may include data to be acted upon by the instructions of the code 724. In particular, the accessing of the code 724 and data 728 by the processors 704 may facilitate image translation operations as described herein.

The processors 704 may include one or more single-core processors, multiple-core processors, controllers, application-specific integrated circuits (ASICs), etc.

The memory 708 may include random access memory (RAM), dynamic RAM (DRAM), static RAM (SRAM), synchronous DRAM (SDRAM), dual-data rate RAM (DDRRAM), etc.

The storage 716 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 716 may be a storage resource physically part of the computing device 700 or it may be accessible by, but not necessarily a part of, the computing device 700. For example, the storage 716 may be accessed by the computing device 700 over a network.

The I/O interfaces 720 may include interfaces designed to communicate with peripheral hardware, e.g., print head 112, navigation sensors 138, optical imaging sensors 146, etc., and/or remote devices, e.g., other devices 120.

In various embodiments, computing device 700 may have more or less elements and/or different architectures.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. An apparatus comprising:
a communication interface configured to receive an image from an image source;
a positioning module configured to
(i) control one or more navigation sensors to capture a first plurality of navigational measurements,
(ii) control the one or more navigation sensors to capture a second plurality of navigational measurements,
(iii) determine a position of the apparatus relative to a reference point based at least in part on the first plurality of navigational measurements, and
(iv) determine a plurality of positions of the apparatus relative to another reference point based at least in part on the second plurality of navigational measurements;
an image capture module configured to
(i) control one or more optical imaging sensors to capture a first plurality of surface images of a first medium adjacent to the apparatus,
(ii) control the one or more optical imaging sensors to capture a second plurality of surface images of a second medium, and
(iii) construct a composite image based at least in part on (i) the second plurality of surface images and (ii) the determined plurality of positions of the apparatus; and
a print module configured to cause a printing substance to be deposited on a first portion of the first medium during multiple passes of the print module over the first portion based at least in part on (i) the image received by the communication interface and (ii) the determined position of the apparatus.

2. The apparatus of claim 1, wherein the positioning module is configured to determine the position of the apparatus relative to the reference point based at least further in part on the first plurality of surface images.

3. The apparatus of claim 1, wherein the communication interface comprises a wireless communication interface.

4. The apparatus of claim 1, wherein the communication interface comprises a port to receive a removable storage device.

5. The apparatus of claim 1, further comprising:
an image processing module configured to process the image received by the communication interface in a manner to facilitate depositing of the printing substance.

6. An apparatus comprising:
a communication interface configured to receive an image from an image source;
one or more optical imaging sensors configured to capture a first plurality of surface images of a first medium adjacent to the apparatus;
one or more navigation sensors configured to capture a plurality of navigational measurements;
a print head configured to deposit a printing substance on a first portion of the first medium during multiple passes of the print head over the first portion; and
a control block configured to
determine a position of the apparatus relative to a reference point based at least in part on the plurality of navigational measurements, and control the print head to deposit the printing substance based at least in part on (i) the image received by the communication interface and (ii) the determined position of the apparatus, wherein the one or more optical imaging sensors are further configured to capture a second plurality of surface images of a second medium adjacent to the apparatus, the one or more navigation sensors are further configured to capture a second plurality of navigational measurements, and the control block is further configured to determine a plurality of positions of the apparatus relative to another reference point based at least in part on the second plurality of navigational measurements, and construct a composite image based at least in part on (i) the second plurality of surface images and (ii) the determined plurality of positions of the apparatus.

7. The apparatus of claim 6, wherein:
the print head has a linear dimension and comprises one or more nozzles rows and;
the one or more optical imaging sensors includes a linear array of optical elements having a linear dimension that is similar to the linear dimension of the print head.

8. The apparatus of claim 6, wherein:
the print head includes a plurality of nozzles; and
the one or more optical imaging sensors include a plurality of optical elements.

9. The apparatus of claim 8, wherein:
a first set of the plurality of nozzles is arranged on a first side of the plurality of optical elements; and
a second set of the plurality of nozzles is arranged on a second side of the plurality of optical elements.

10. The apparatus of claim 9, wherein the first set of the plurality of nozzles includes (i) nozzles for a first colored printing substance and (ii) nozzles for a second colored printing substance.

11. The apparatus of claim 9, wherein:
a third set of the plurality of nozzles is arranged on a third side of the plurality of optical elements; and
a fourth set of the plurality of nozzles is arranged on a fourth side of the plurality of optical elements.

12. The apparatus of claim 8, wherein the plurality of nozzles are arranged around the plurality of optical elements.

13. The apparatus of claim 12, wherein the plurality of nozzles are arranged in rings around the plurality of optical elements.

14. A method comprising:
receiving, by an image translation device, an image from an image source;

controlling, by the image translation device, one or more navigation sensors to capture a first plurality of navigational measurements;

controlling, by the image translation device, the one or more navigation sensors to capture a second plurality of navigational measurements;

controlling, by the image translation device, one or more optical image sensors to capture a first plurality of surface images of a first medium adjacent to the one or more optical image sensors;

controlling, by the image translation device, the one or more optical image sensors to capture a second plurality of surface images of a second medium;

determining, by the image translation device, a position of an image translation device relative to a reference point based at least in part on the first plurality of navigational measurements;

determining, by the image translation device, a plurality of positions of the image translation device relative to another reference point based at least in part on the second plurality of navigational measurements;

controlling, by the image translation device, a print head to deposit a printing substance on a first portion of the first medium during multiple passes of the print head over the first portion based at least in part on (i) the received image and (ii) the determined position; and constructing, by the image translation device, a composite image based at least in part on the determined plurality of positions and the second plurality of surface images.

15. The method of claim 14, further comprising:
determining the position of the image translation device based at least further in part on the first plurality of surface images.

16. The method of claim 14, further comprising:
processing the received image in a manner to facilitate said controlling of the print head to deposit the printing substance.

17. An apparatus comprising:
a communication interface configured to receive an image from an image source;
a positioning module configured to
control one or more navigation sensors to capture a first plurality of navigational images of a first medium,
detect structural variations of the first medium based on the first plurality of navigational images, and
determine movement of the apparatus relative to a reference point based at least in part on the detected structural variations; and
a print module configured to cause a printing substance to be deposited on the first medium based at least in part on the image received by the communication interface and the determined movement of the apparatus.

* * * * *